July 28, 1931.   M. JOACHIMSON   1,816,536
MACHINE FOR MAKING SANDWICHES
Filed June 16, 1927    4 Sheets-Sheet 1
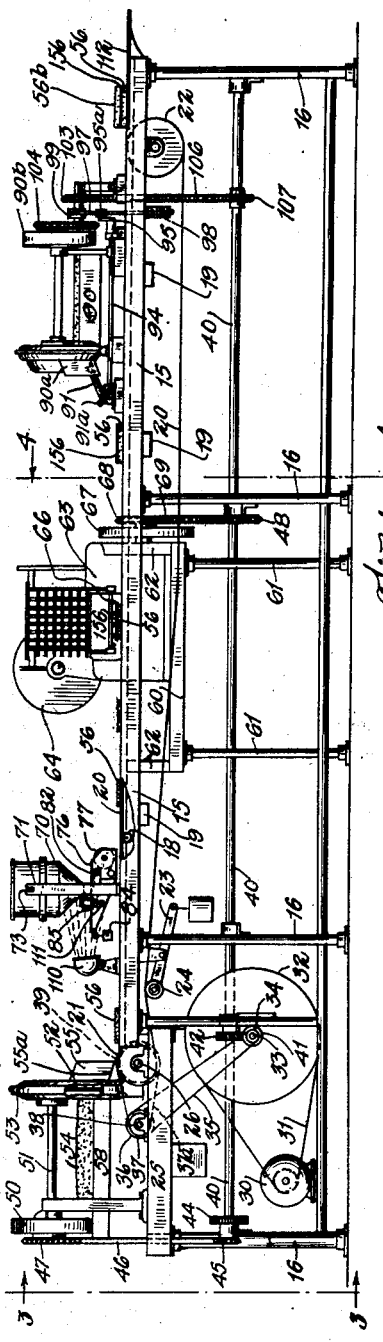
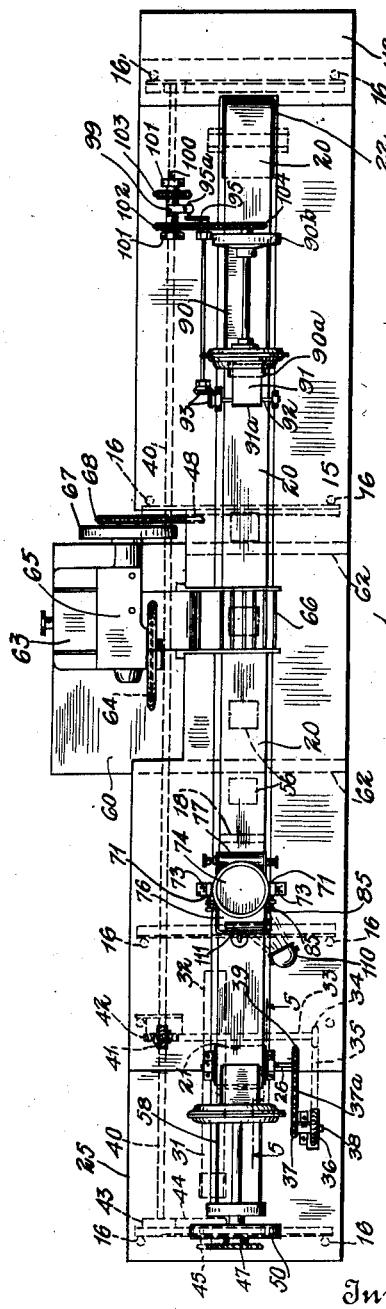
Inventor
Martin Joachimson
By his Attorney

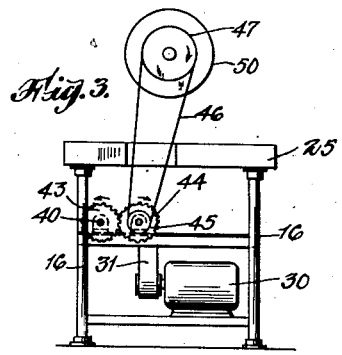
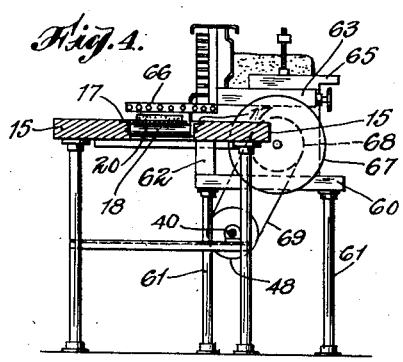
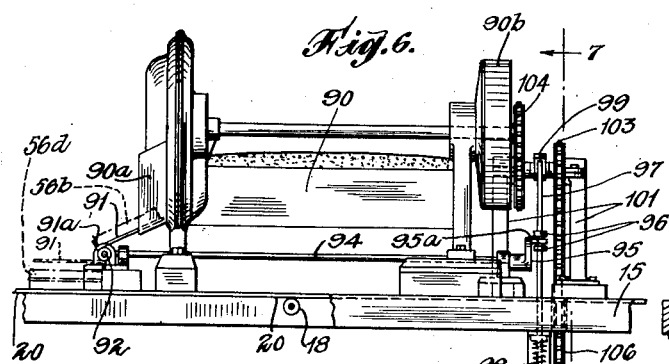
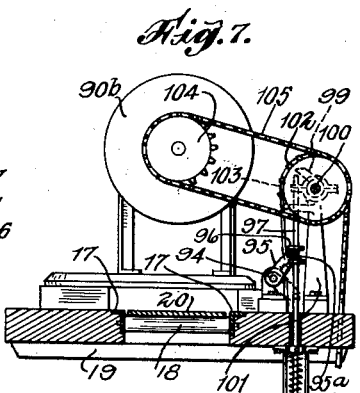
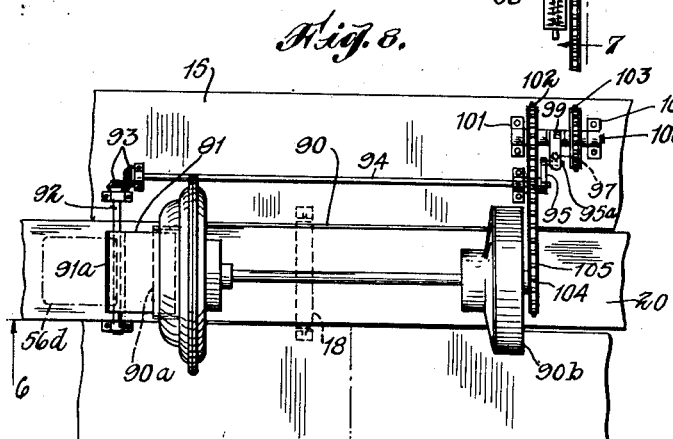
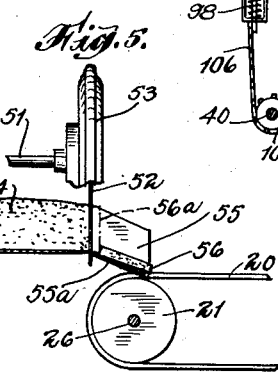

July 28, 1931. M. JOACHIMSON 1,816,536
MACHINE FOR MAKING SANDWICHES
Filed June 16, 1927 4 Sheets-Sheet 3
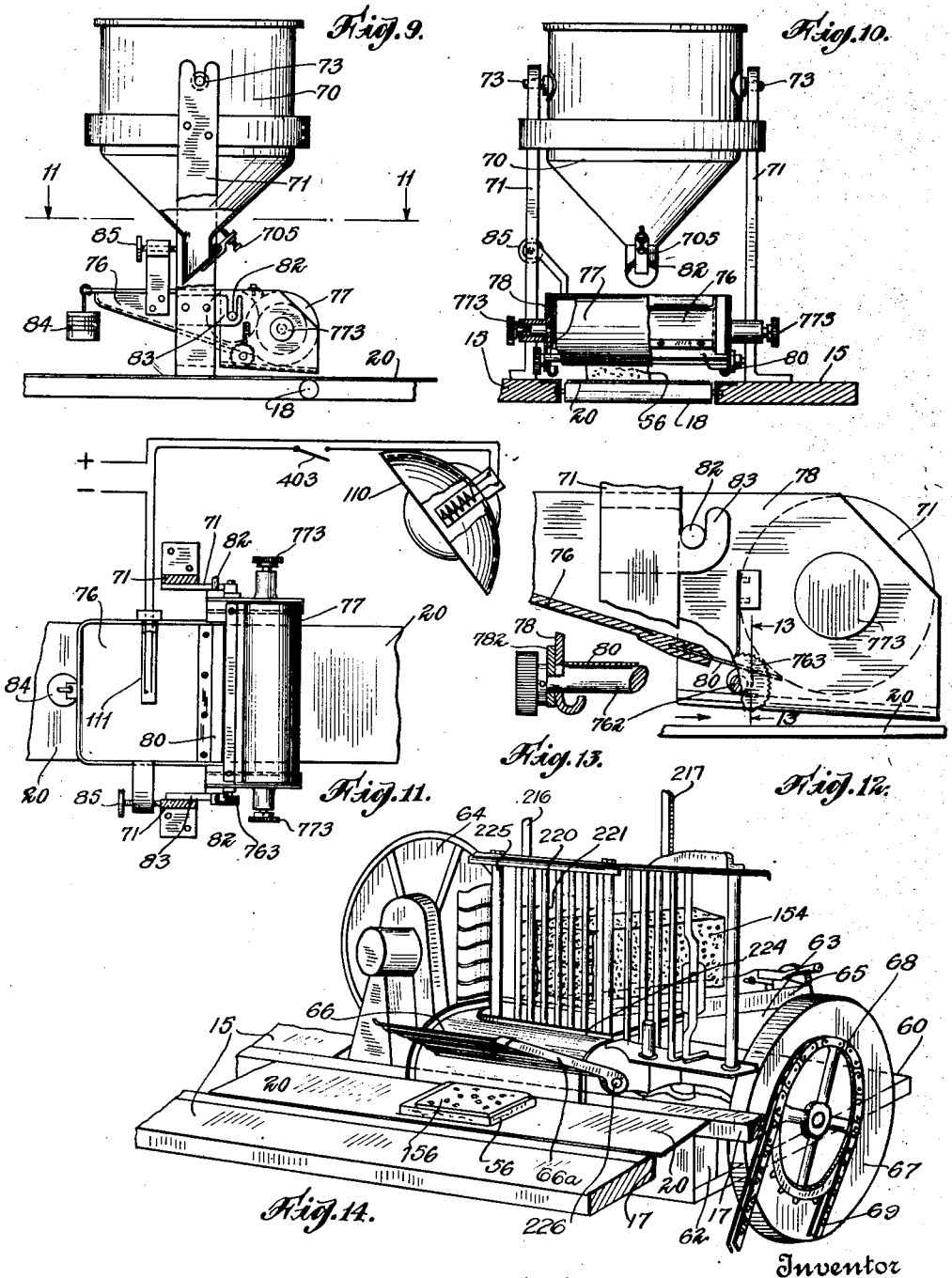
Inventor
Martin Joachimson
By his Attorney
Walter E. Wollheim

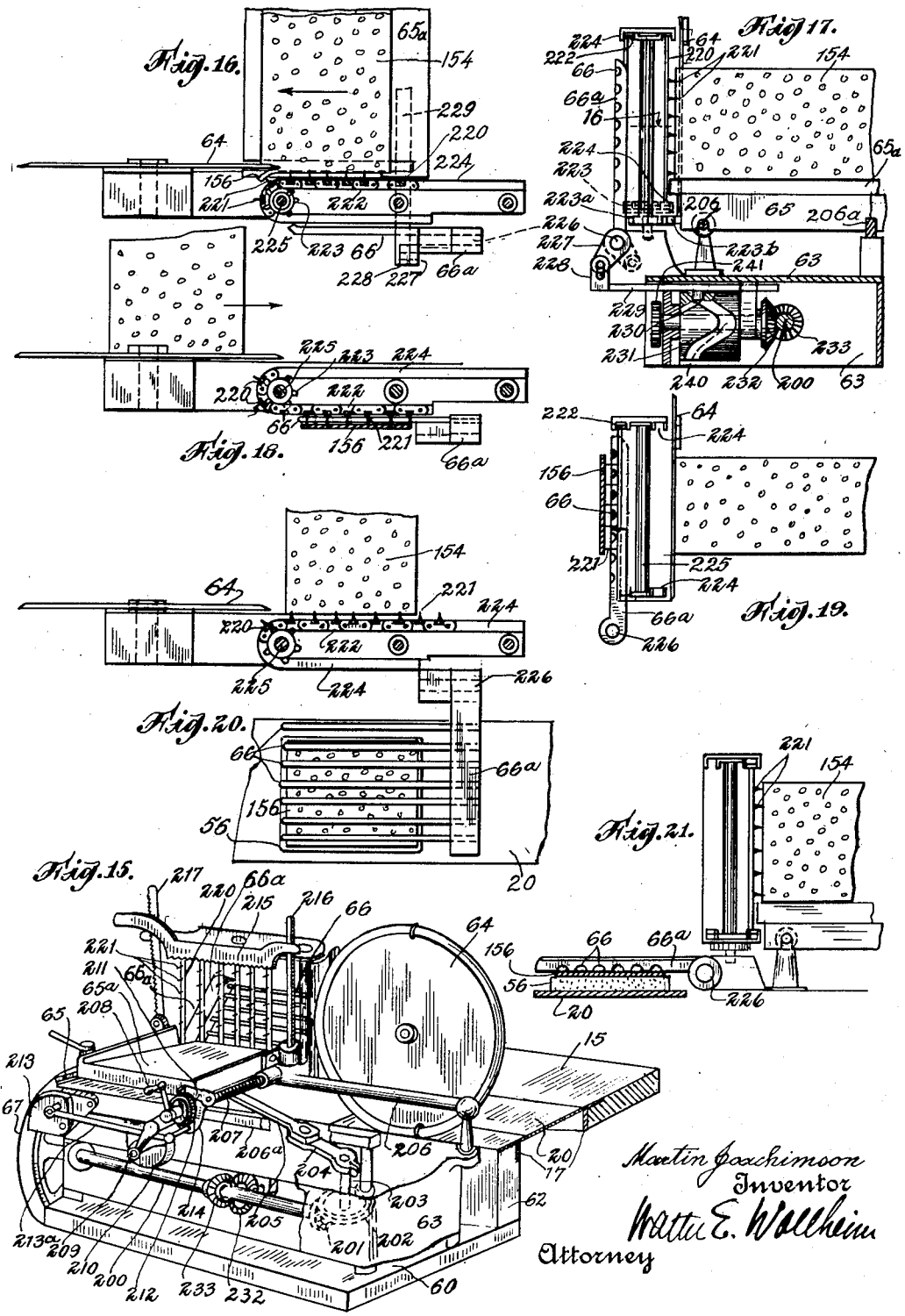

Patented July 28, 1931

1,816,536

UNITED STATES PATENT OFFICE

MARTIN JOACHIMSON, OF NEW YORK, N. Y.

MACHINE FOR MAKING SANDWICHES

Application filed June 16, 1927. Serial No. 199,269.

This invention relates to machines for making sandwiches. It is the object of this invention to produce complete sandwiches by cutting slices of bread from a loaf, to butter the slices, to cut a loaf of meat, cheese or similar foodstuff into slices and place them upon the buttered bread slices, cut a second loaf of bread into slices and place them upon the buttered and meat covered bread slices.

With this and other objects in view the invention consists in a novel combination of apparatus to perform the various steps for producing a sandwich and in an arrangement of parts which is hereinafter fully described and finally pointed out in the appended claims.

In the accompanying drawings which form a materal part of this disclosure:

Fig. 1 is a front elevation of the complete machine.

Fig. 2 is a plan view of the machine seen from above the same.

Fig. 3 is an end elevation of the machine seen in the direction of arrows 3—3 at Fig. 1.

Fig. 4 is a sectional elevation on line 4—4 of Fig. 1.

Fig. 5 is a detail section on line 5—5 of Fig. 2 showing the delivery apron 55a and belt 20 to illustrate the transfer of a bread slice from the former to the latter.

Fig. 6 is an enlarged front elevation of the second bread cutter 90.

Fig. 7 is a sectional side elevation on line 7—7 of Fig. 6.

Fig. 8 is a top plan view of Fig. 6.

Fig. 9 is a side elevation of the buttering device. Parts of standards 71 and storage container 70 are broken away to show interior construction.

Fig. 10 is a front elevation of Fig. 9 having parts of roller 77 and side plates 78 removed to show interior construction.

Fig. 11 is a sectional plan on line 11—11 of Fig. 9 including reflecting heater 110 in its relative position to the buttering device.

Fig. 12 is a detail side elevation of the forward part of butter container 76 partly broken to show roller and knife mountings.

Fig. 13 is a detail sectional elevation on line 13—13 of Fig. 12 showing the manner of adjusting knife 80.

Fig. 14 is a perspective view of the meat cutting machine 65 in its position at table 15.

Fig. 15 is a rear perspective view of the meat slicing device. Parts of the casing 63 are broken away to show the interior driving mechanism.

Fig. 16 is a diagrammatic plan of the meat delivery device, partly in section on line 16 of Fig. 17. In this figure the parts of the device are shown in their relative positions at the beginning of the cutting and transfer operations.

Fig. 17 is a side elevation of Fig. 16 showing the operating means for the delivery rack 66. Casing 63 is shown in section to show the parts enclosed therein.

Fig. 18 is a diagrammatic plan like Fig. 16 but the parts of the meat delivery device are shown in their relative position at the end of the transfer operation and the beginning of the delivery operation.

Fig. 19 is a side elevation of Fig. 18.

Fig. 20 is a plan like Fig. 18 showing the parts of the delivery device at the end of the delivery operation when a slice of meat has been delivered on a moving bread slice in registering position.

Fig. 21 is a side elevation of Fig. 20.

This sandwich machine consists of a long table of which 15 is the top plate supported at intervals upon suitable legs 16. The table top is provided with a wide longitudinal slot faced with angle irons 17 which hold at intervals rollers 18. The two parts of table top 15 are held together by suitable braces 19 extending transversely across the space between them. Upon rollers 18 runs an endless conveyor belt 20 preferably a rough canvas. This belt is driven by means of a friction pulley 21 at one end of the table top 15 and runs over an idler pulley 22 at the opposite end of the table top. Belt 20 is pressed against pulley 21 by a belt tightening lever 23 and pulley 24. The upper face of belt 20 is arranged level with or above the surface of table 15. Driving pulley 21 is mounted upon a somewhat lower table 25 attached to the main table 15 and below this table is mounted an electric motor 30 upon suitable frame work attached to posts 16. The pulley of this motor drives by belt 31 a large pulley 32 mounted upon a transverse shaft 33 which carries near one end a sprocket 34. This sprocket drives by chain 35 a compound set of sprockets 36 and 37 which have a common shaft 38. Sprocket 37 drives by means of chain 37a a large sprocket 39 on shaft 26 of pulley 21. By this sprocket-gear reduction, pulley 21 and belt 20 are driven at a very low speed. Transverse shaft 33 carries near its end opposite to sprocket 34 a spiral pinion 41 which meshes into spiral gear 42 mounted upon a longitudinal shaft 40 which extends the full length of the machine. At the end of this shaft above motor 30 it carries a spur gear 43 which drives by means of idler gear 44 a sprocket 45 mounted therewith upon a common short shaft which drives by a chain 46 a large sprocket 47 attached to the fly wheel 50 of a bread cutting machine which is mounted upon table 25. The bread cutting machine is preferably of the type in which a circular knife performs a planetary motion for cutting slices of bread from a loaf which is automatically fed forward between strokes of the knife, but bread cutters of other types may also be successfully employed in this sandwich machine.

The fly wheel 50 drives by means of shaft 51 a circular knife 52 enclosed in housing 53. A bread-loaf 54 is fed forward towards and beyond this knife by suitable mechanism (not shown) and vertical slices 56a are cut off therefrom by knife 52. The front end of the housing 53 carries a delivery cage 55 of which the bottom side or apron 55a forms an angle with the horizontal plane. The slice of bread cut off (see Fig. 5) falls upon this apron 55a, but the pulley 21 and belt 20 are so arranged partly within delivery cage 55, that the front part of slice 56 comes to lie upon the moving belt 20 and is carried away upon the same longitudinally over the whole length of table 15.

Near the center of the machine another table-like support 60 is placed below the table top 15. It is supported on posts 61 and tied by means of braces 62 to the main table 15. Table 60 supports a meat slicing machine 63 which is preferably equipped with a rotary knife 64 and a sliding carriage 65 which supports the loaf of meat (or cheese) 154 to be sliced (see Fig. 14). This machine is provided with an automatic feeding mechanism and a delivery rack or "stacker" 66. The delivery rack is so placed that the meat slices are delivered upon belt 20 and if a bread slice cut by the bread cutting knife 52 is at the instant of delivery below the rack 66 the slice of meat 156 is laid upon the bread slice 56. Machine 63 is provided with a fly wheel 67 for driving the same and to this fly wheel a sprocket 68 is attached which receives motion by means of chain 69 from a similar sprocket 48 on longitudinal shaft 40 (see Fig. 4).

The automatic feeding mechanism is best shown in the rear view of the meat slicing machine illustrated in Fig. 15. Fly wheel 67 rotates a pair of bevel gears 201 and 202 by means of shaft 200 which gears rotate by shaft 203 a crank 204. Connecting rod 205 which is pivotally attached to crank 204 and to the lower side of carriage 65 reciprocates this carriage on guides 206 and 206a. Upon carriage 65 slides meat table 65a perpendicularly to guides 206—206a when moved by feed screw 207. This feed screw can be operated either manually by handle crank 208 or automatically by crank 209 which is actuated by a cam 210 once during every reciprocation of carriage 65 at the end of the stroke. A pawl 211 and ratchet 212 are provided to limit the turning motion of screw 207 and thereby the thickness of slices to be cut by means of varying the throw of pawl 211 on ratchet 212.

This throw of pawl 211 can be varied by setting segment 213 and connecting rod 213a with pawl plate 214 towards the right or left. The meat loaf 154 which is to be sliced may be clamped upon reciprocating table 65a by means of pressing bar 215 which is guided on two vertical toothed bars 216 and 217. The saw teeth on these bars co-operate with teeth on the pressing bar 215. A suitable spring presses bar 217 towards the left locking it in clamping position.

The delivery mechanism or stacker appears in Figs. 14 to 21. It consists of a movable screen composed of a plurality of vertical bars 220, each provided with horizontal pins 221 which are equally spaced from each other and directed at the start of a slicing operation towards the slicing face of the meat loaf 154. Upper and lower ends of these bars are fastened to the links of chains 222 which are operated by sprockets 223 and by a pinion 223a driven by rack 223b on meat carriage 65. Chains 222 run in stationary guide rails 224 around post 225 so that the pins 221 which at the beginning of a forward stroke point toward the meat table 65a (see Figs. 16 and 17) point away from it at the end of the stroke (see Figs. 18 and 19).

A delivery rack consisting of horizontal bars 66 supported at one end by an oscillating arm 66a is mounted in front of screen 220 on shaft 226. This shaft receives oscillatory motion from the main shaft 200 by means of bevel gears 233—232, which rotate a drum cam 231. The groove of this cam accommodates roller 230 which reciprocates bar 229 provided with link 228. This link moves crank 227 into the dotted position of Fig. 17 and thereby oscillates shaft 226 and deliver rack 66 from the vertical position of Fig. 17 to the horizontal position of Fig. 13

21 at the proper time during the cycle of operation. The horizontal bars 66 of the delivery rack are so placed that the pins 221 may slide into the spaces between these bars entering at their unsupported ends when the delivery rack is in vertical position as shown in Figs. 18 and 19.

The cycle of cutting and delivering a meat slice is shown in Figs. 16 to 21 in diagrammatic manner. In Figs. 16 and 17 meat loaf 154 has been fed forward to slicing position by the operation of feed screw 207 so that the slicing face of 154 is slightly in front of knife disk 64 which is rotated by means of a chain drive from sprocket 241 mounted on shaft 240. The forward movement of 154 has pressed the meat loaf upon pins 221 which have slightly entered into the meat. The meat loaf 154 is then carried by table 65a in the direction of the arrow of Fig. 16 and knife 64 has begun the slicing operation as shown in Fig. 16. The first vertical row of pins 221 in contact with the meat has turned the sliced portion slightly around post 225. The delivery rack arm 66a is in vertical position. As the slicing operation proceeds and the screen bars 220 with pins 221 move with equal speed as carriage 65, the severed slice 156 is carried by these pins to the front of the horizontal bars 66 at the end of the forward stroke as shown in Figs. 18 and 19. During the return stroke of carriage 65 the delivery rack 66 oscillates into horizontal position and delivers the meat slice 156 upon the bread slice 56 while screen 220 with pins 221 returns to its initial position as shown in Figs. 20 and 21. The delivery rack then returns to its vertical position while the meat loaf is fed forward onto pins 221 for the next slicing operation.

Between the bread cutting machine and the meat slicing machine a buttering apparatus 76 is placed on table top 15 above belt 20. This apparatus consists of two vertical standards 71 placed on either side of belt 20. They carry in a vertical slot at their upper ends trunnions 73 which hold a butter storage vessel 70. The storage vessel has a funnel shaped bottom provided with a lid-like valve 82 which may be opened and closed gradually by means of a screw 705 to regulate the flow of semi-liquid butter contained therein into a butter container 76 located below the same.

The butter container 76 is rectangular in plan and of substantially the same width as belt 20, it is provided with a bottom slanting downward in the direction of belt movement. The deep end of container 76 is closed by a roller 77 rotatably mounted thereon. Roller 77 may be removed from container 76 by pulling knobs 773 outward, which releases the roller from center pins or pivots on which it is mounted (see Fig. 10).

A knife 80 attached to the slanting bottom of container 76 adjusts the thickness of butter coating on roller 77 by means of a shaft 762 which is rotated by knob 763 and eccentrically mounted in journals 782 attached to side plates 78 (see Figs. 12 and 13). The fountain 76 is supported on two trunnions 82 which rest in vertical slots of hook-like brackets on standards 71. The shallow end of container 76 is provided with an adjustable weight 84, so that it may be held in substantially horizontal position by balancing its weight about trunnions 82. Above the upper edge of container 76 a horizontal adjusting screw 85 is attached thereto the point of which leans against one of the standards 71. By means of this screw the distance between belt 20 and the lower edge of roller 77 may be adjusted. In operation the roller end of the fountain is made to overbalance slightly and the space between roller 77 and belt 20 is adjusted to be slightly less than the thickness of a bread slice as cut by bread cutting machine 58. The roller which turns partly in the butter of container 76 is then slightly lifted by the approaching bread slice and rotated thereby. It gives up its butter to the passing bread slices. The belt below the slice being resilient, adds to apply the butter evenly, even though the bread slice may be somewhat unequal in thickness transversely. The whole buttering device forms the subject of a copending application for Letters Patent for "device for spreading butter" filed June 16th, 1927, Ser. No. 199,268 wherein its construction is more specifically illustrated and described.

To keep the butter at the proper operating temperature an electric bowl heater 110 is placed upon table 15 which directs its rays against storage vessel 70 and container 76. The current flowing through this heater may be either manually controlled by means of a switch 403 or preferably by a thermostat 111 inserted into the butter of the container (see Fig. 11). Thermostats of this kind consist preferably of a pair of metallic bars each being composed of two different metals having different coefficients of expansion which open and close an electric circuit by their deflection. The bowl of heater 110 reflects heat produced by a resistor 109 in the direction of the buttering device when connected to an electric line at points marked + and −.

To place a second slice of bread upon the buttered and meat covered slice 56, a second bread cutting machine 90 is arranged upon the table 15, so that it straddles belt 20 and that its knife faces the knife of machine 58.

Completed sandwiches comprising two slices of bread with a slice of meat interposed therebetween may pass below the machine 90 upon belt 20. The machine is in all respects like machine 58 except that it is provided with a fly deliverer 91 separately attached to table top 15. The delivery plate 91 rests partly within the delivery cage 90a upon its slanting bottom so that a bread slice 56b cut off by machine 90 falls thereon, the front end of the slice leaning against the stop 91a of the delivery plate 91 (see Fig. 6). Plate 91 turns upon a shaft 92 connected by miter gears 93 to a longitudinal shaft 94 which is provided at its end with a crank 95 having a pin 95a. This crank pin 95a may be moved vertically by two collars 96 between which it is arranged. These collars 96 are held on a vertical rod 97. The vertical movement of rod 97 turns crank 95 and the delivery plate 91 so that the bread slice thereon is turned to face downward and laid upon any other slice which just passes on belt 20.

The vertical rod 97 is mounted upon a helical spring 98 which presses it upward and its upper rounded end is periodically depressed by a pawl 99 mounted upon a shaft 100 which is held in standards 101 on table 15.

Shaft 100 carries also two sprockets 102 and 103 of which 102 drives a sprocket 104 of like diameter attached to fly wheel 90b of the bread cutter by means of chain 105. Sprocket 103 is driven by means of chain 106 from a sprocket 107 on longitudinal shaft 40. By this arrangement the fly delivery plate is operated once during every revolution of the bread cutter and this delivery is timed to the action of the bread cutter 58 and meat slicer 63 as all three machines are driven by the same shaft 40.

From the foregoing description the operation of making complete sandwiches will probably be clearly apparent but some remarks appear in place. Belt 20 as well as the bread and meat slicing machines are driven by the same motor and the two shafts 33 and 40 are geared together so that a perfectly synchronized operation of all machines is obtained after they are once placed in proper position on table 15.

It is a particular advantage of the chain connections between the main driving shaft 40 and the operating mechanisms of the several cutting devices that the time of delivery of each of said devices and therefore the elapsed time between deliveries of two devices can easily be varied by opening a chain, turning the sprocket on the delivery device forward or back and replacing the chain. A very fine adjustment to get perfect registration of the meat slice on the bread slice can be obained by shifting the meat loaf on the slicing machine table 65a parallel to the belt 20 so that when the delivery rack 66 is exactly horizontal, a meat slice is in register with a bread slice. In practically the same manner the delivery of bread slicing machine 90 can be obtained by moving it longitudinally on table 15.

The buttering device is driven only through the traveling bread slice by the belt 20 it stands still in the intervals beween passing slices. The sandwiches which are completed in placing the upper bread slice thereon by the fly delivery continue to travel on belt 20 to the end of table 15 where they are shifted upon a metal plate 112 covered with a sheet of paper into which the sandwiches are wrapped by hand. The buttering device 76 with its roller 77 is so balanced that it exerts only sufficient pressure upon the passing bread slice to permit it to rotate the roller and to wipe the butter coating therefrom without moving on the belt and therefore without losing its register in relation to the other slices or the other two machines which have to deposit their slices thereon.

Having thus described my invention what I claim as new and desire to cover by Letters Patent is:

1. In a machine of the kind described the combination of a support adapted to hold a plurality of bread slices, means to move said support and the slices thereon, yieldingly mounted above said support rotatable means for applying butter upon the bread slices and for preserving the position of each bread slice on said support, means for placing meat on each bread slice, means delivering a second bread slice upon said meat slice, said meat placing means and said bread delivery means being each provided with continuously operating means to deliver slices at equal intervals, common means for operating said support and said delivery means in timed relation and connecting means adapted for varying the time between deliveries of said meat placing device and said bread delivery means.

2. In a machine of the kind described, a frame, a belt movably mounted thereon, a plurality of slicing devices each device supporting a loaf of edible material outside of the area of said belt and including a delivery device adapted to deliver food slices upon said belt at equal intervals, power driven means to operate said belt and connecting means joining each slicing device separately to said operating means, said connecting means being adjustable to vary the time of delivery of each device for placing a slice cut by one slicing device accurately upon a moving slice cut by another slicing device.

3. In a machine for making sandwiches a frame, a carrier supported thereby, means for operating said carrier, a plurality of food cutting devices mounted at spaced distances along the carrier, said spacing being determined by the time of travel between said devices to deliver cut slices of food upon said carrier at distances fixed by said spacing, each of said food cutting devices consisting of an independently operable unit including a separate base, for supporting a loaf of edible material, a knife for cutting said material into slices and rotatable means for operating said knife, all held on said base and geared means joining the operating means of all food cutting units to the operating means of said carrier for delivering said food slices upon each other while moving on said carrier.

4. In a machine of the kind described, a frame, a belt of resilient material on said frame, means for moving said belt continuously at uniform speed, a support adapted to hold bread slices in upright position, delivery means operated independently of said belt at timed intervals to turn said slices into horizontal position and to discharge them upon said belt equally spaced, a container for butter above said belt, a roller adapted to remove butter from said container, said belt being adapted to pass the slices to said roller and to press them against the same by its resiliency for applying a uniform film of butter to each passing slice.

5. In a machine of the kind described a plurality of food cutting devices, each device including an independently rotatable knife and driving means therefor to discharge food slices at equal time intervals, a support adapted to receive the cut slices, means to move said support perpendicularly to the cutting planes of said knives, a buttering device mounted above said support between said cutting devices, said buttering device including a container for butter, a roller held within said container to receive butter therefrom by adhesion, and connecting means joining the driving means of all cutting devices fixing the instants of their discharge in a predetermined cycle and in accordance with the distance between slices cut by one of said knives.

6. In a machine for making sandwiches, a support, a carrier on said support adapted to hold bread slices, means to move said carrier, a feeding device adapted to support bread slices in upright position and for placing these slices flat upon said carrier while in motion and a food cutting device including a knife and a support for a loaf of edible material, said knife forming means to cut said material into slices and delivery means to receive a slice from said cutting device and to place it upon said carrier, said bread feeding device and said food slice delivery means being definitely spaced from each other in the direction of the movement of said carrier and operating means actuating said feeding means and said delivery means at timed intervals to place one of the cut meat slices upon each moving bread slice.

7. In a machine for making sandwiches, a support, a conveyor, means moving said conveyor constantly at uniform speed, a bread cutter including delivery means adapted to place bread slices upon said conveyor, a meat cutter definitely spaced from said bread cutter and including delivery means adapted to place meat slices upon said conveyor, said bread placing means and said meat placing means being provided with operating means and adapted to deliver slices instantly at equal intervals and common means for operating said conveyor and for actuating the operating means of said bread placing means and said meat placing means in timed relation and in accordance with their spacing from each other for delivering a meat slice upon each moving bread slice.

8. In a machine for making sandwiches, a support, a conveyor movable lengthwise thereof, a pair of bread cutting devices, each provided with operating means and with a slice supporting plate inclined towards said conveyor, one of said plates being oscillatable into a plane parallel to the surface of said conveyor, a meat cutting device at one side of said conveyor between said bread cutting devices including operating means and a delivery plate oscillatable from a vertical position at the side of said conveyor into a parallel plane above the same, a shaft parallel to said conveyor and geared driving means joining the operating means of each cutting device to said shaft.

9. A machine for making sandwiches comprising a support, a conveyor on said support movable lengthwise thereof, a bread cutting device having a knife and delivery means transversely to said conveyor, a meat cutting device having a knife at said conveyor to one side thereof, delivery means on said meat cutting device spaced a definite distance from said bread delivery means and actuating means cooperatively joining said bread and meat delivery devices for timing their deliveries in accordance with their spacing from each other to place a meat slice upon each bread slice.

10. In a machine of the kind described, a support, a conveyor on said support movable lengthwise thereof, a bread cutting device in longitudinal alinement with said conveyor, delivery means adapted to receive slices from said bread cutting device and to hold these slices in sloping position against said conveyor for removal by friction of the conveyor surface.

11. In a machine for making sandwiches, a support, a conveyor movable lengthwise thereof, a bread slicing device including means to deliver bread slices in the direction of conveyor travel, a meat cutting device including delivery means oscillatable about an axis parallel to the side of said conveyor into a horizontal position above said conveyor, and a device on said support for buttering the bread slices on said conveyor including a roller and means to vary the pressure of said roller against the passing bread slices.

12. In a machine of the kind described, a support, a carrier thereon, means for moving said carrier at uniform speed, delivery means including an angularly disposed plate adapted to place bread slices upon said carrier to be carried away by friction of said carrier, a food cutter including a knife operable in a vertical plane and fly delivery means adapted to discharge food slices a spaced distance above said carrier, said fly delivery means being definitely spaced from said bread delivery means and in geared connection to operate synchronously therewith and to place slices to lie flat upon said carrier and upon each other equally spaced on the surface of said carrier.

13. A sandwich machine comprising in combination, an endless conveyor belt, means for moving said belt at a uniform speed, a bread slicing machine at one end of said conveyor and having means cooperating therewith to place successively cut bread slices in uniform and definite spaced relation to each other on said conveyor, a meat slicing machine positioned at an intermediate portion of the conveyor and having means cooperating therewith to place meat slices on the successively cut bread slices, and a second bread slicer positioned beyond the meat slicer and having means cooperating therewith to place successively cut bread slices in uniform and definite relation upon the bread slices delivered by the conveyor belt from the first bread slicing machine.

14. In a machine of the kind described a frame, a belt movable longitudinally of said frame, a bread slicing device near one end of said belt including a knife transversely to said belt and means for delivering slices cut by said knife upon said belt in the direction of belt motion, a device for cutting a loaf of edible material into slices, having a knife parallel to said belt and means to deliver slices cut by said knife transversely upon said belt, said slicing devices being held a spaced distance apart and geared means to operate said devices to deliver slices at intervals timed with each other to place a slice cut by said second device upon each slice cut by said first device.

15. In a machine of the kind described a frame, a carrier thereon, means separate from said carrier to turn bread slices from a vertical into a horizontal plane and to place them upon said carrier at equal distances from each other, a buttering device above said carrier in the path of said slices and including means to retain said slices in their places on said carrier, a device for cutting a loaf of edible material into slices mounted outside of the area of said carrier and having delivery means swinging into and out of the path of said carrier, means for varying the distance between said delivery devices, means for continuously operating said carrier and geared means to operate said devices to deliver slices at intervals in timed relation to the distance between said devices.

In testimony whereof, I, MARTIN JOACHIMSON, have signed my name to this specification, this 14th day of June, 1927.

MARTIN JOACHIMSON.